United States Patent [19]
Chong

[11] Patent Number: 6,145,014
[45] Date of Patent: Nov. 7, 2000

[54] METHOD AND SYSTEM FOR ESTABLISHING DDE CONVERSATION BETWEEN SOURCE MANAGER SOFTWARE AND DATA SOURCE SOFTWARE

[75] Inventor: Rudy Chong, Hsinchu, Taiwan

[73] Assignee: Mustek Systems Inc., Hsinchu, Taiwan

[21] Appl. No.: 08/999,117

[22] Filed: Dec. 29, 1997

[51] Int. Cl.[7] ................................................. G06F 13/10
[52] U.S. Cl. ........................................... 709/328; 709/321
[58] Field of Search ..................................... 709/301, 300, 709/203, 302

[56] References Cited

U.S. PATENT DOCUMENTS

| | | | |
|---|---|---|---|
| 5,617,528 | 4/1997 | Stechmann et al. | 395/326 |
| 5,764,155 | 6/1998 | Kertesz et al. | 340/825.08 |
| 5,819,092 | 10/1998 | Ferguson et al. | 395/701 |
| 5,911,044 | 6/1999 | Lo et al. | 395/200.33 |
| 5,938,738 | 8/1999 | Mu-Teng | 709/301 |
| 6,003,093 | 12/1999 | Kester | 709/301 |

OTHER PUBLICATIONS

C. Lindley, "Image Acquisition Using TWAIN", Dr. Dobb's Journal, p. (14), Sep. 1994.

*Primary Examiner*—Majid A. Banankhah
*Assistant Examiner*—Sue Lao
*Attorney, Agent, or Firm*—Merchant & Gould P.C.

[57] ABSTRACT

The present invention establishes DDE conversation between Data Source software and Source Manager software in TWAIN interface. The invention primary involves in TWAIN-DDE actions which convert TWAIN operation triplets into DDE codes. Consequently, TWAIN can adapt to Microsoft Windows 95 and Windows NT and exist in a computer network. The invention also allows Data Source Software to stand alone for being accessed by a client application software.

11 Claims, 7 Drawing Sheets

METHOD AND SYSTEM FOR ESTABLISHING DDE CONVERSATION BETWEEN SOURCE MANAGER SOFTWARE AND DATA SOURCE SOFTWARE

BACKGROUND OF THE INVENTION

A. Field of the Invention

The present invention relates to a method and system for building communications between Source Manager software and image acquisition device based on a new protocol, especially to a conversation for converting TWAIN operations into DDE operations.

B. Description of the Prior Art

TWAIN (Tool kits Without An Interesting Name) is a standard software protocol and application programming interface for communicating application software and Data Source software. The application software refers to the software for image application, fax application, or word processor application. The Data Source software refers to the software applied in digital camera, scanner or image database.

TWAIN involves in three parts: the application software, the Source Manager software, and the Data Source software. The application software follows TWAIN specifications to acquire images. The Source Manager software manages the interactions between the application software and the Data Source software. The Data Source software controls the image acquisition device. The communication among these three must follow the TWAIN specifications.

Their interactions can be illustrated in FIG. 1. FIG. 1 shows the TWAIN architecture. As FIG.1 shows, the application layer is for the execution of software application. The protocol layer is for specifying the syntax and semantics defined by TWAIN. The acquisition layer is for controlling the acquisitions of physical or logical acquisition devices by a Data Source software. The device layer is for conventional low-level device drivers.

Refer to FIG. 2, the communication among application software 201, Source Manager software 202 and Data Source software 203 is through two entry points as specified by TWAIN. They are function calls DSM_Entry( ) 204 and DS_Entry( ) 205. DSM refers to Source Manager software and DS refers to Data Source software. The application software 201 and Data Source software 203 communicate to the Source Manager software 202 through the Source Manager software's 202 only entry point, the DSM_Entry( ) function 204. In C programming language, the function call can be represented as:

```
TW_UINT16 FAR PASCAL DSM_Entry (
        pTW_IDENTITY           pOrigin,
        pTW_IDENTITY           pDest,
        TW_UINT32              DG,
        TW_UINT16              DAT,
        TW_UINT16              MSG,
        TW_MEMREF              pData);
```

The Source Manager software 202 communicates to the Data Source software 203 through the Data Source software's 203 only entry point, the DS_Entry o function 205. In C programming language, the function call can be represented as:

```
TW_UINT16 FAR PASCAL DS_Entry (
        pTW_IDENTITY           pOrigin,
        TW_UINT32              DG,
        TW_UINT16              DAT,
        TW_UINT16              MSG,
        TW_MEMREF              pData).
```

The DSM_Entry( ) 204 and DS_Entry( ) 205 functions are used to communicate operations. The desired action is defined by the operation triplets passed as three parameters in these function calls. Each triplet specifies a specific action. The three parameters that make up the triplet are Data Group (DG), Data Argument Type (DAT), and Message ID (MSG). Each parameter conveys specific information.

DEFINITION OF THE OPERATION TRIPLETS

The Triplets are Defined as:
Data Group (DG_XXX): Operations are divided into large categories by the Data Group identifier. There are currently only two defined in TWAIN.
DG_CONTROL: These operations involve in the control of TWAIN session. An example that DG_CONTROL is used as Data Group identifier is the operation to open the Source Manager.
DG_IMAGE: These operations work with image data. An Example that DG_IMAGE is used as the Data Group is an operation that requests data transfer.
Data Argument Type (DAT_XXX): This parameter of the triplet identifies the type of data that is being passed or operated upon. The argument type may refer to a data structure or a variable. There are many data argument types which all have a prefix of DAT_. One example is DAT_IDENTITY.
Message ID (MSG_XXX): This parameter identifies the action that the application or Source Manager wishes to take. There are many different messages such as MSG_GET, or MSG_SET. They all have a prefix of MSG_.

EXAMPLES OF THE OPERATION TRIPLETS

According to the triplets defined above, there can be many combination of operations. For instance, the operation triplet that the application sends to the Source Manager software to open Source Manager software module is:

DG_CONTROL/DAT_PARENT/MSG_OPENDSM.

The triplets that the application sends to instruct the Source Manager software to display it's Select Source dialog box and thus allow a user to select which Source they plan to obtain data from is:

DG_CONTROL/DAT_IDENTITY/MSG_USERSELECT.

The triplets that Source Manager software sends to transfer data from the data Source software into a file is:

DG_IMAGE/DAT_IMAGEFILEXFER/MSG_GET

The reason why we explain TWAIN in such a detail is because these information will be helpful to understand our invention set forth later on. There are several disadvantages of TWAIN due to its design philosophy. For instance, the communications among TWAIN layers are basically through function calls. In other words, the Data Source software is actually a group of function libraries waiting to be called by the application software. Therefore, the Data Source software must be installed in the same machine as the application software. Moreover, they also share the same memory space and resources. This limitation restricts the robustness of the system. If one side is down, the other side will too. And the Data Source can only be driven at the time when Image application software requests. More importantly, TWAIN is not designed for a computer network. This becomes a major disadvantage for an image acquisition device locating at a remote site.

SUMMARY OF THE INVENTION

Accordingly, it is an object of the present invention to provide a method and system for communicating Source Manager software with Data Source software using MIA-DDE protocol, thereby to convert TWAIN operations into DDE operations.

It is another object of the present invention to provide a method and system for applying DDE in TWAIN interface and allowing Data Source software to stand alone as a server.

It is a further object of the invention to provide a new protocol for converting TWAIN code into DDE code, thereby to allow application software and Data Source software to communicate with each other via computer networks.

Briefly described, the present invention encompasses a method for applying DDE in TWAIN interface comprising the steps of: (1) receiving TWAIN operation triplets; (2) converting the TWAIN operation triplets into TWAIN-DDE actions; (3) initiating DDE conversation between Source Manager software and Data Source software in response to the TWAIN-DDE actions; (4) sending a response from Data Source software in response to the DDE conversation; (5) initiating TWAIN-DDE actions in response to the response of Data Source software; and (6) converting TWAIN-DDE actions into TWAIN operation triplets.

Accordingly, the present system encompasses: an application interface at a host computer for inputting image acquisition instructions comprising TWAIN operations; Source Manager means at the host computer for receiving the image acquisition instructions and converting the TWAIN operations into a plurality of TWAIN-DDE actions; means for initiating MIA-DDE conversation between the host computer and the image acquisition device in response to each of the TWAIN-DDE actions; and Data Source means at said image acquisition device for forwarding image data to said host computer in responsive to said MIA-DDE conversation.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

Figure 1:
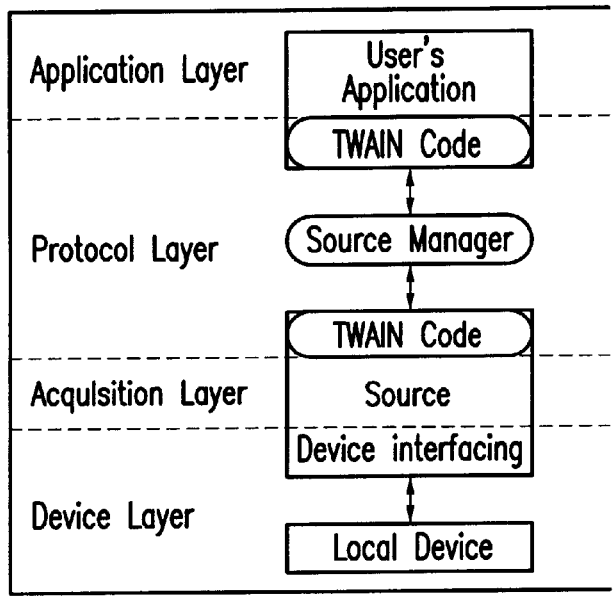
FIG. 1 is a schematic diagram showing the protocol layers of TWAIN architecture.
Figure 2:
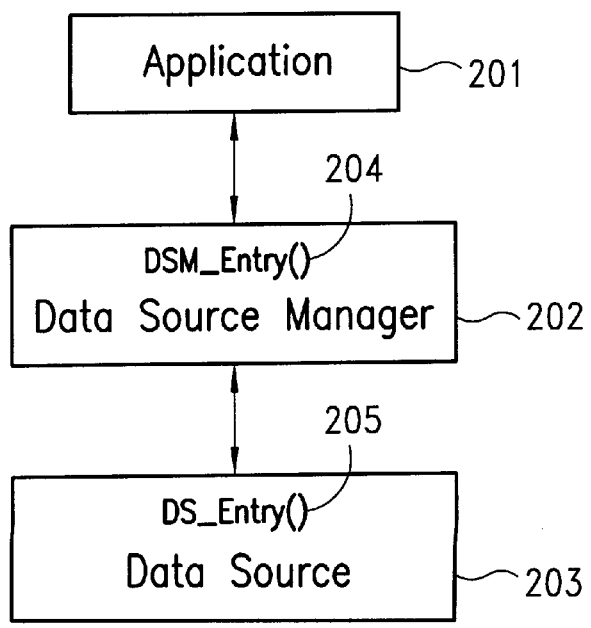
FIG. 2 is a schematic diagram showing the interaction among Data Source software, Source Manager software, and application software.

The invention intends to solve the problems occurred in TWAIN by providing a new protocol called MIA-DDE (Mustek Image Acquire—Dynamic Data Exchange). This new protocol can convert TWAIN operation triplets into DDE code. Since DDE is a standard conversation of Microsoft Windows, TWAIN will be able to adapt to the Windows system. That means TWAIN can exist in a computer network because Windows 95 and Windows NT both support Network DDE. Moreover, by converting to DDE code, the Data Source software can be an execution file and act as a server to be accessed by client application software.

To achieve these objects, the invention provides a new protocol MIA-DDE and implements it between Source Manager software and Data Source software for converting TWAIN operation triplets into DDE codes. In the following we will explain this new conversation in detail including its semantic and syntax, its tokens, its data structures, and its representation of image data. Then, we will use a few examples to explain how MIA-DDE works.

Syntax and Semantic of MIA-DDE Conversation Protocol

SENTENCE: Set of tokens ordered in specific sequence. Usually it represents a macro of actions. In the conversation it is denoted in letters typed with uppercase and italic.

Poke: Single token with the form "Poke( )" that Data Source hears specific data from TWAIN-DDE.

Request: Single token with the form "Request( )" that Data Source answers specific data to TWAIN-DDE.

HotLink: tokens with the form "HotLink( )" following after Build, Destroy, and Trigger.

Conversation Body

The complete conversation MIA_DDE of MIA-DDE is represented as follows:

```
MIA_DDE=
    Request(OpenDS)
    {
        UI_TRANSFER|
        [QUERY_IMAGE]...
    }
    Request(CloseDS)
UI_TRANSFER =
    UI_ENABLE
    [
        Trigger-HotLink(NotifyXfer)
        QUERY_IMAGE
    ]...
    Trigger-HotLink(NotifyClose)
    UI_DISABLE
UI_ENABLE=
    Poke(EnableUI)
    Build-HotLink(NotifyXfer)
    Build-HotLink(NotifyClose)
UI_DISABLE=
    Request(DisableUI)
    Destroy-HotLink(NotifyXfer)
    Destroy-HotLink(NotifyClose)
```

-continued

```
QUERY_IMAGE=
    [
        Poke(QueryImage)
        Request(QueryBlock)
        [
            Request(QueryBlock)
        ]...
        Request(StopQuery)
    ]...
```

THE TOKENS

Request(OpenDS)

This token always comes first for letting Data Source get ready to prepare necessary resources for the following actions. The transferred data from Data Source to TWAIN-DDE attached on this token is called Data Source Descriptor. Data Source will specify related information associated itself in this descriptor. If Data Source cannot be opened properly, Data Source will return the status field with constant FAILURE in descriptor. This will terminate further conversation from TWAIN-DDE.

Request(CloseDS)

This token is always the last one appeared in the entire conversation. Data Source should free or close any resource in response to this request. Note that Data Source must accept this request and assume TWAIN-DDE will never continue the conversation.

Poke(EnableUI)

This token will enable Data Source user interface and wait for actions of user. The transferred data called Image Descriptor specifies a suggested descriptor of image property. Data Source will examine each field in this descriptor and enable user interface with the values specified by the descriptor. If a specific field has a value of DONTCARE, then Data Source will enable the user interface in response to any value it requests. If Data Source cannot enable user interface properly, it will return FAILURE to TWAIN-DDE. This token will be followed by two HotLink( ).

Request(DisableUI)

This token will disable Data Source user interface. Then it will be followed by two destroys of HotLink( ). If the token comes in wrong sequence, or Data Source doesn't enable its user interface, Data Source will return status FAILURE. Data Source will always accept this token, and stay in the state that is same to the state that just received Request(OpenDS).

HotLink(NotifyXfer)

Hot Link HotLink( ) has three forms of token Build, Destroy, and Trigger. This Hot Link HotLink(NotifyXfer) is used for Data Source to notify TWAIN-DDE user action about transferring image data from Data Source to image application.

Build-HotLink(NotifyXfer):

This token is for TWAIN-DDE to ask Data Source to build Hot Link HotLink(NotifyXfer). It always follows after the Request(EnableUI). It can be specified before or after building HotLink(NotifyClose).

Destroy-HotLink(NotifyXfer):

This token is the destroying action of HotLink (NotifyXfer). It always follows after the Request (DisableUI). It can be before or after destroying HotLink (NotifyClose).

Trigger-HotLink(NotifyXfer):

The triggering of HotLink(NotifyXfer) is in response to the user action when he wants to transfer image data from Data Source to image application. The user action can be enabled by pressing the "Scan" button. Then, it will trigger TWAIN-DDE to progress the conversation. An Image Descriptor is attached on this token to describe the image property that the user selects.

HotLink(NotifyClose)

This Hot Link HotLink(NotifyClose) is for Data Source to notify TWAIN-DDE user action to end the acquisition of image.

Build-HotLink(NotifyClose):

This token is a building action of HotLink(NotifyClose). It always follows after the Request(EnableUI). It can be enabled before or after building HotLink(NotifyXfer).

Destroy-HotLink(NotifyClose):

This token is a destroy action of HotLink(NotifyClose). It always follows after Request(DisableUI). It can be enabled before or after destroying HotLink(NotifyXfer).

Trigger-HotLink(NotifyClose):

The triggering of this HotLink(NotifyClose) is in response to the user action of ending the acquisition of image. The user action can be enabled by pressing on "Close" button. It will trigger TWAIN-DDE to progress the conversation.

Poke(QueryImage)

The image data is transferred block by block. This Poke (QueryImage) will start a process of acquisition of image block. That is, it will be followed by a sequence of tokens Request(QueryBlock). The Image Descriptor attached on this token from TWAIN-DDE to Data Source specifies the property of image that is going to be transferred. The image property is specified by image application or user. No field in this descriptor will be DONTCARE. Data Source must provide the image exactly as this descriptor specified.

Request(QueryBlock)

The image data are transferred in a sequence of blocks. Each block contains a Block Descriptor and a few image data. The first field of Block Descriptor is the status returned. Four constants are allowed including:

- OK: Indicates there are still blocks following this block. But if Data Source receives a Request(StopQuery), the following blocks should be discarded, and the transfer stops.
- DONE: Indicates this is the final block of image.
- FAILURE: Indicates this is the final block of an incomplete transfer caused by some reason. And this will also inform TWAIN-DDE to discard the blocks transferred before this block.
- CANCEL: Indicates this is the final block of an incomplete transfer caused by user's cancel. And this will also inform TWAIN-DDE to discard the blocks transferred before this block.

Request(StopQuery)

This token will terminate the sequence of Request (QueryBlock), and end the request of this single image. The first field of Image Descriptor attached on this token from Data Source to TWAIN-DDE indicates the termination of the whole image acquisition.

- OK: Indicates there are still images following this image. The other fields in Image Descriptor specify the property of next transferred image.
- DONE: Indicates all image are transferred. The QUERY_IMAGE is finished.
- FAILURE: Indicates that the transfer of the rest images is terminated because of some reason. The QUERY_IMAGE will then be terminated.
- CANCEL: Indicates that the transfer of rest images is canceled by user's request. The QUERY_IMAGE will then be terminated.

THE DATA STRUCTURES

DS_DESCRIPTOR

Data Source descriptor for Data Source property. This is used only at Request(OpenDS).

```
typedef struct tagDS_DESCRIPTOR {
    TD_ULONG ulSizeOfValid;
    TD_RETURNCODE rcInfo;
    TD_LONG lMaxXSize;
    TD_LONG lMaxYSize;
    TD_LONG lNativeXResolution;
    TD_LONG lNativeYResolution;
    TD_LONG lMaxXResolution;
    TD_LONG lMaxYResolution;
    TD_BOOL bSupportAutoBrightness;
    TD_BOOL bSupportAutoFeeder;
    TD_PIXELTYPE ctSupportPixelType;
    TD_COMPRESSION cpSupportCompression;
    TD_ULONG ulReserved;
    TD_ERRORMSG emErrorMsg;
} DS_DESCRIPTOR, *LPDS_DESCRIPTOR;
```

Field ulSizeOfValid: Size of structure DS_DESCRIPTOR without ulReserved, and emErrorMsg. Data Source must assign this field to the value TDSV_DS.

rcInfo: Information about the request of OpenDS. There are only two constants allowed:
  TDRC_OK: Indicates the Request(OpenDS) is succeed, and
  TDRC_FAILURE: Indicates the Request(OpenDS) is failed, and the reason should fill in the string emErrorMsg.

lMaxXsize: Maximum width of image in X-direction that Data Source can scan.

The unit is inch/100. For example, the value 850 in this field is equal to 8.5 inches.

lMaxYSize: Maximum length of image in Y-direction that Data Source can scan.
The unit is also inch/100.

lNativeXResolution: Optical resolution in the X-direction. The unit is dpi (dots per inch). Note that the relation between dots number and size (inch/100), resolution (dpi) is as follows:

dots number=(size * resolution/100)

where the operators "*", and "/" here are both integer arithmetic operators.

lNativeYResolution: Optical resolution in the X-direction. The unit is dpi (dots per inch), too.

lMaxXResolution: Maximum resolution in the X-direction that Data Source supports. The unit is dpi.

lMaxYResolution: Maximum resolution in the Y-direction that Data Source supports. The unit is dpi.

bSupportAutoBrightness: Auto brightness support of Data Source. TRUE means Data Source does support; otherwise FALSE.

bSupportAutoFeeder: Auto feeder support of Data Source. TRUE mean Data Source does support; otherwise FALSE.

ctSupportPixelType: Pixel types that Data Source supports. In this version of TWAIN-DDE, there are only three constants allowed. They should be combined with OR operator together.

TDPT_BAW: Black and white pixel type.
TDPT_GRAY: Gray pixel type.
TDPT_RGB24: 24-bits RGB color pixel type.

cpSupportCompression: Compression types that Data Source supports. In this version of TWAIN-DDE, there are only two constants allowed.
TDCP_NONE: No compression.
TDCP_LOWSCALE: The data is compressed to lower resolution. TWAIN-DDE will interpolate the image to the original resolution.

ulReserved: These 5*4 bytes are reserved for further need.

emErrorMsg: Error message. When the rcInfo is equal to TDRC_FAILURE, this message will be showed to user. Note this string is only 60 bytes and zero-ended, so Data Source must not fill in over 59 letters.

IMAGE_DESCRIPTOR

Image descriptor used at Poke(EnableUI), Poke (QueryImage), and Trigger-HotLink(NotifyXfer).

```
typedef struct tagIMAGE_DESCRIPTOR {
    TD_ULONG ulSizeOfValid;
    TD_RETURNCODE rcInfo;
    TD_LONG lXResolution;
    TD_LONG lYResolution;
    TD_PIXELTYPE ptPixelType;
    TD_PIXELFLAVOR pfPixelFlavor;
    TD_LONG lOrientX;
    TD_LONG lOrientY;
    TD_LONG lImageWidth;
    TD_LONG lImageHeight;
    TD_BOOL bAutoBrightness;
    TD_SHORT sBrightness;
    TD_SHORT sContrast;
    TD_COMPRESSION cpCompression;
    TD_ULONG ulReserved;
    TD_ERRORMSG emErrorMsg;
} IMAGE_DESCRIPTOR, *LPIMAGE_DESCRIPTOR;
```

Field ulSizeOfValid: Size of structure IMAGE_DESCRIPTOR without ulReserved. You must assign this field to the value TDSV_IMAGE.

rcInfo: Information about this action of token. There are four constants allowed. Specific meaning will depend on the kind of token.

lXResolution: Resolution of image in X-direction. The unit is dpi. Don't Care Constant is TDLG_DONTCARE.

lYResolution: Resolution of image in Y-direction. The unit is dpi. Don't Care Constant is TDLG_DONTCARE.

ptPixelType: The pixel type of image. There are only four constants allowed in this version of TWAIN-DDE. These constants cannot be ORed together, they must stand along.
TDPT_DONTCARE: Don't Care Constant of pixel type.
TDPT_BAW: Black and white pixel type.
TDPT_GRAY: Gray pixel type.
TDPT_RGB24: 24-bits RGB color pixel type.

pfPixelFlavor: Sense of the pixel whose value is zero. There are only two constants are allowed.
TDPF_DONTCARE: Don't Care Constant of pixel flavor.
TDPF_CHOCOLATE: Indicates the value of darkest (blackest) pixel is 0.
TDPF_VANILLA: Indicates the value of brightest (whitest) pixel is 0.

lOrientX: The left-most edge of image in pixel under resolution lXResolution. Don't Care Constant is TDLG_DONTCARE.

lOrientY: The top-most edge of image in pixel under resolution lYResolution. Don't Care Constant is TDLG_DONTCARE.

lImageWidth: The width of image in pixel under resolution lXResolution. Don't Care Constant is TDLG_DONTCARE.

lImageHeight: The height of image in pixel under resolution lYResolution. Don't Care Constant is TDLG_DONTCARE.

bAutoBirghtness: If this field is valued with TRUE, the support of auto brightness will be enabled in the acquisition of image, and the field sBrightness will be ignored.

sBrightness: The brightness of image. This value must between −1000 and 1000. Don't Care Constant is TDSR_DONTCARE.

sContrast: The contrast of image. This value must between −1000 and 1000. Don't Care Constant is TDSR_DONTCARE.

cpCompression: The compression of image. There are only two values allowed in this version of TWAIN-DDE.

TDCP_DONTCARE: Don't Care Constant of compression type.

TDCP_NONE: No compression is applied.

TDCP_LOWSCALE: Low scale compression is applied.

ulReserved: These 4*4 bytes are reserved for further need.

INFO_DESCRIPTOR
Information about specific token.

```
typedef struct tagINFO_DESCRIPTOR {
    TD_RETURNCODE rcInfo;
    TD_ERRORMSG emErrorMsg;
} INFO_DESCRIPTOR, *LPINFO_DESCRIPTOR;
```

Field
  rcInfo: The information about specific token. There are two constants allowed.
    TDRC_OK: OK, no problem, the string in emErrorMsg will be ignored.
    TDRC_FAILURE: Some problems, the string in emErrorMsg will be showed to user.
  emErrorMsg: The error message to be showed to user, it's only 60 bytes.

BLOCK_DESCRIPTOR
The block descriptor of block without any compression type.

```
typedef struct tagBLOCK_DESCRIPTOR {
    TD_RETURNCODE rcInfo;
    TD_LONG lBlockSize;
    TD_LONG lRows;
} BLOCK_DESCRIPTOR, *LPBLOCK_DESCRIPTOR;
```

Field
  rcInfo: The information about the acquisition of this image block. There are four constants allowed.
    TDRC_OK: Means that this block is acquired normally, and there are still blocks waiting to be acquired.
    TDRC_DONE: Means that this block is acquired normally, and the whole image is all transferred.
    TDRC_FAILURE: Means that the acquisition of this image is failed, and the transfer will be terminated.
    TDRC_CANCEL: Means that the acquisition of this image is canceled by user, and the transfer will be terminated.
  lBlockSize: The size of rows' data followed after this descriptor.
  lRows: The number of rows of image in this block.

LOWSCALE_DESCRIPTOR
The Common Descriptor Block of low-scale compression type.

```
typedef struct tagLOWSCALE_DESCRIPTOR {
    TD_LONG lLowXResolution;
    TD_LONG lLowYResolution;
} LOWSCALE_DESCRIPTOR, *LPLOWSCALE_DESCRIPTOR;
```

Field
  lLowXResolution: The lower resolution in X-direction. The unit is dpi.
  lLowYResolution: The lower resolution in Y-direction. The unit is dpi.

LOWSCALE_BLOCK
The block descriptor of block with low-scale compression type.

```
typedef struct tagLOWSCALE_BLOCK {
    TD_RETURNCODE rcInfo;
    TD_LONG lBlockSize;
    TD_LONG lRows;
} LOWSCALE_BLOCK, *LPLOWSCALE_BLOCK;
```

Field
  rcInfo: The information about the acquisition of this image block. There are four constants allowed.
    TDRC_OK: Means that this block is acquired normally, and there are still blocks waited to be acquired.
    TDRC_DONE: Means that this block is acquired normally, and the whole image is all transferred.
    TDRC_FAILURE: Means that the acquisition of this image is failed, and the transfer will be terminated.
    TDRC_CANCEL: Means that the acquisition of this image is canceled by user, and the transfer will be terminated.
  lBlockSize: The size of compressed rows' data followed after this descriptor.
  lRows: The number of rows of image in this block.

THE REPRESENTATION OF IMAGE DATA

The representation of image data depends on three fields in structure IMAGE_DESCRIPTOR when Data Source receives the Poke(QueryImage).

They are
  pfPixelFlavor: indicates the representation of single pixel.
  ptPixelType: indicates the organization of single pixel.
  cpCompression: indicates the organization of image data.

In the following, we will discuss these fields:

pfPixelFlavor
This field indicates the color of pixel that the value 0 represents.

Constant

TDPF_CHOCOLATE: Indicates the darkest (blackest) pixel is represented as value 0. In a Black & White two color image, the possible values for image pixel is only 0 and 1. This constant TDPF_CHOCOLATE indicates the value of black pixel will be 0. Also in a Gray image, this indicates the value 0 represent the darkest pixel among possible value between 0 and 255. And for a RGB image (which each pixel is organized in 24 bits and 8 bits for each red, green, blue channel) the value {0,0,0} represent the darkest pixel.

TDPF_VANILLA: In contrast to the constant TDPF_CHOCOLATE, the brightest (whitest) is represented as value 0.

ptPixelType

This field indicates the organization of single pixel. There are only three constant allowed for this field in this version of TWAIN-DDE. But they can be extended for further need.

Constant

TDPT_BAW: Pixel is organized in one bit. Each byte can contain 8 pixels.

TDPT_GRAY: Pixel is organized in one byte. The domain of possible value is varied between 0 and 255.

TDPT_RGB24: Pixel is organized in three bytes, each byte for each red, green, and blue channel. These three bytes must be in order of R-G-B. The domain of possible value is varied between {0,0,0} and {255,255,255}.

cpCompression

This field indicates the organization of image data.

Constant

TDCP_NONE: No compression is applied. Each image data block transferred in Request(QueryBlock) contain two parts, the block descriptor BLOCK_DESCRIPTOR and the rows' data. The rows' data is organized depending on the constant in the field ptFixelType.

TDPT_BAW: Each row data contains n bytes. There cannot be any dummy byte between each row.

$n=(\text{pixel number of each row}+7)/8$ where the operators "+" and "/" are both integer arithmetic operators.

TDPT_GRAY: Each row data contains n bytes. The n is equal to pixel number of each row. Each row must be followed exactly after the row before it. That mean that there cannot be any dummy byte between each row.

TDPT_RGB24: Each pixel data contains three bytes, each byte for each red, green, blue channel. And each row contains n bytes, where n $n=(\text{pixel number of each row})*3$ There cannot be dummy bytes between each row, too.

TDCP_LOWSCALE: This constant indicates the compressed data is organized in lower resolution. The first block Common Descriptor Block leading image data blocks is LOWSCALE_DESCRIPTOR. And the image block contain two parts: the block descriptor LOWSCALE_BLOCK and compressed rows' data. The compressed rows' data is organized as same as TDCP_NONE, only it's in lower resolution, not in original resolution.

Figure 3:
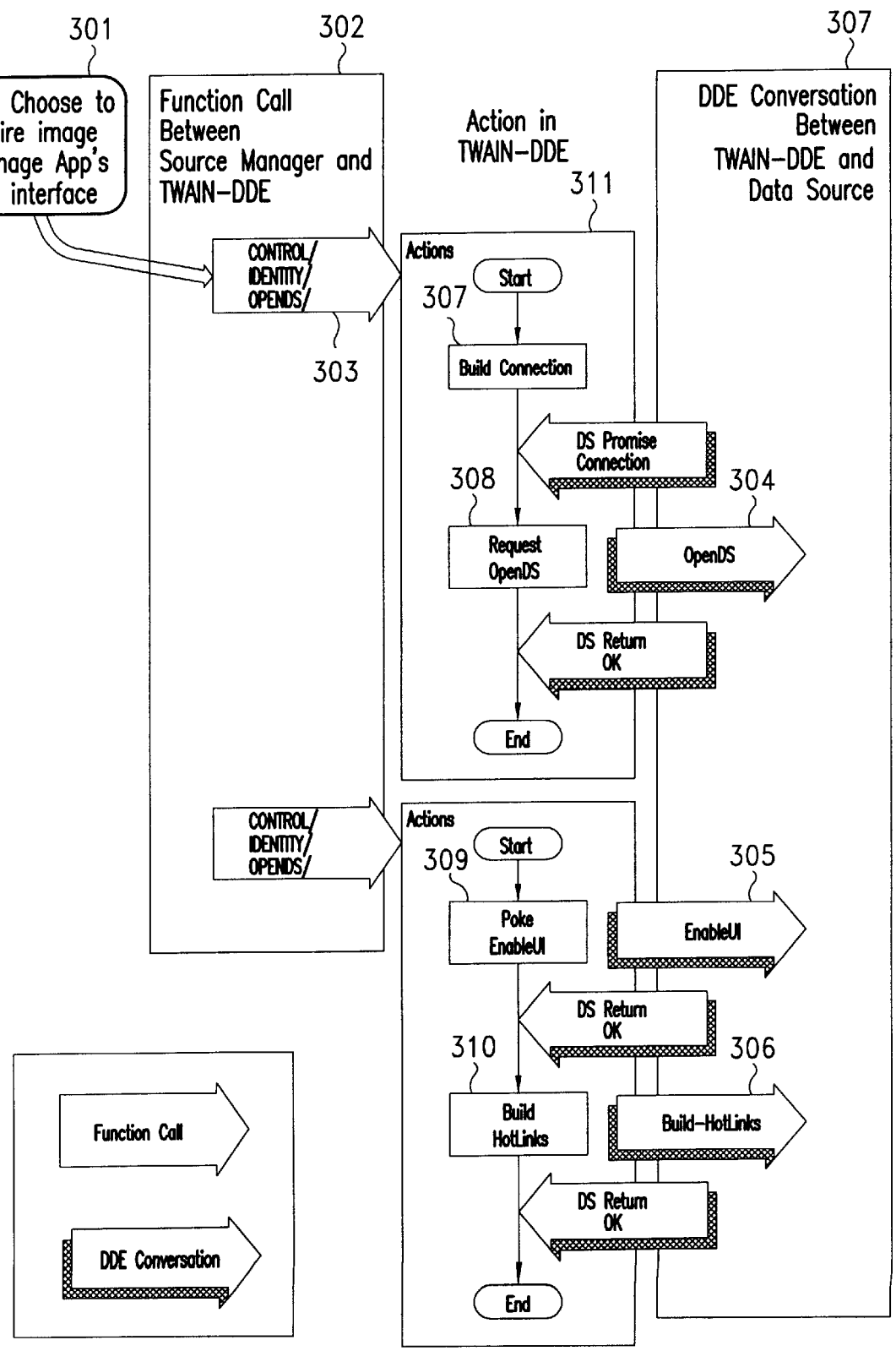
FIG. 3 is a schematic diagram showing an example of communication among Source Manager, TWAIN-DDE, and Data Source when a user wants to build a connection.

To give a more clear idea about how the conversation actually works under a few circumstances, refer to FIG. 3 for an example of interaction among Source Manager software, TWAIN-DDE, and Data Source software when a user wants to build a connection between the application software and Data Source software. These requests are converted to TWAIN function calls and sent to Source Manager software 302. The function calls contain operation triplets (CONTROL/IDENTITY/OPENDS) 303. The TWAIN-DDE action 311 controlled by Source Manager software 302 then takes the operation triplets and convert them into DDE conversation 307 which includes connecting, enabling its user interface and building hot links. The TWAIN-DDE action 311 includes "Request OpenDs" 308, "Poke EnableUI" 309, "Build HotLinks" 310. If the DDE conversation 307 returns OK, the communication between Source Manager software 302 and Data Source software is successful. Then the TWAIN-DDE action starts to have a conversation between the Data Source software using "OpenDS" 304, "EnableUI" 309, and "Build-HotLinks" 310 respectively.

Figure 4:
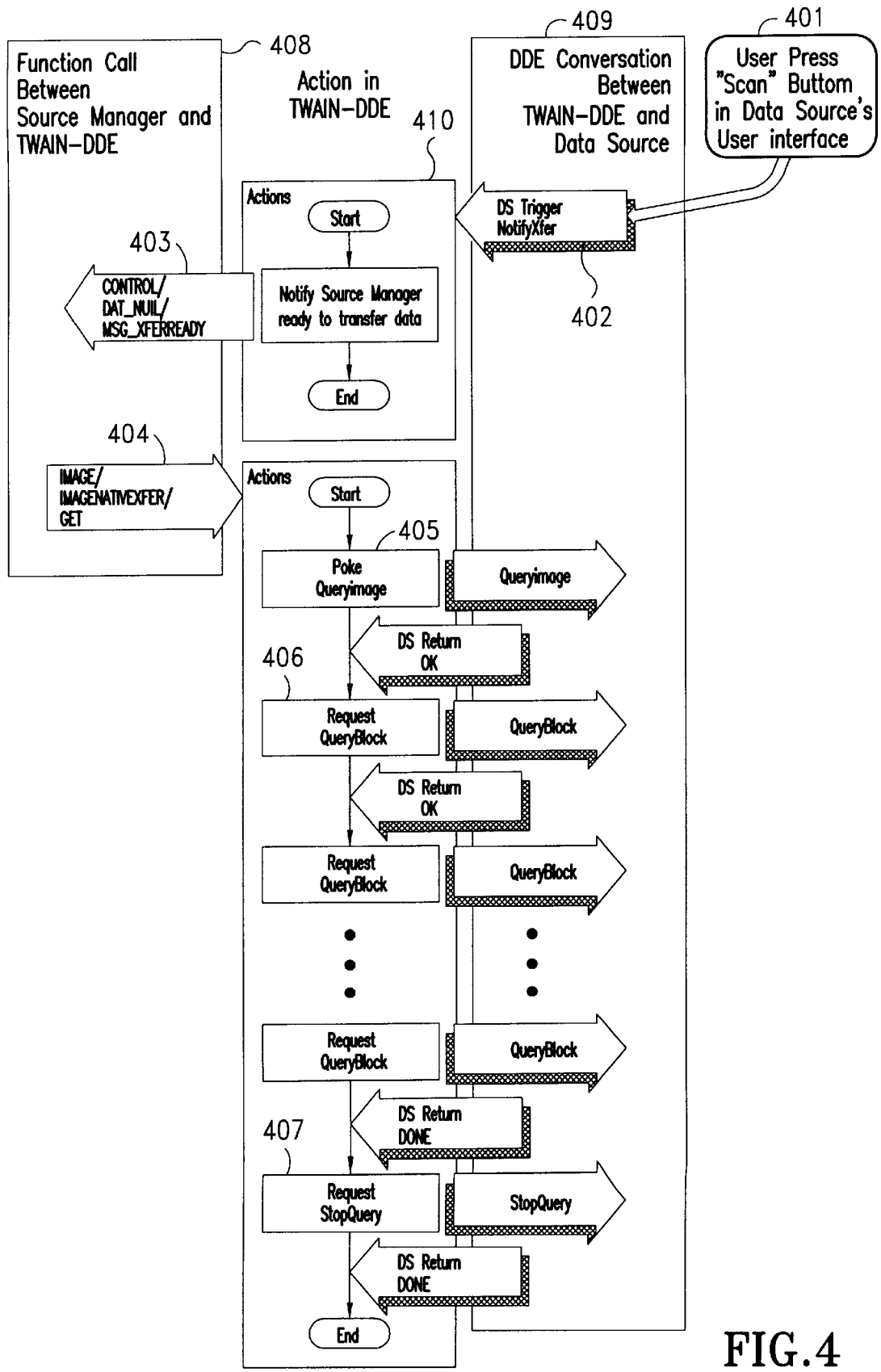
FIG. 4 is a schematic diagram showing an example of communication among Source Manager, TWAIN-DDE, and Data Source when a user wants to request image data.

Refer to FIG. 4, it shows an example of interaction among Source Manager software, TWAIN-DDE, and Data Source software when the user wishes to request image data. After the connection is established, the user can press "Scan" button at the user interface of Data Source software 401. Then DDE conversation 409 triggers this request 402. TWAIN-DDE action 410 notifies Source Manager software 408 ready to transfer data. These commands are converted to TWAIN operation triplets (DG_CONTROL/DAT_NULL/MSG_XFERREADY) 403 and forwarded to Source Manager software 408. The Source Manager software 408 then responds with TWAIN operation triplets (DG_IMAGE/DAT_IMAGENATIVEXFER/MSG_GET) 404. The TWAIN-DDE action 410 takes these operation triplets and converts them into a sequence of actions, including "Poke QueryImage" 405, "Request QueryBlock" 406, and "StopQuery" 407. If the DDE conversation 409 returns OK, the communication is successful. The image data will then be successfully sent to Source Manager software 408.

Figure 5:
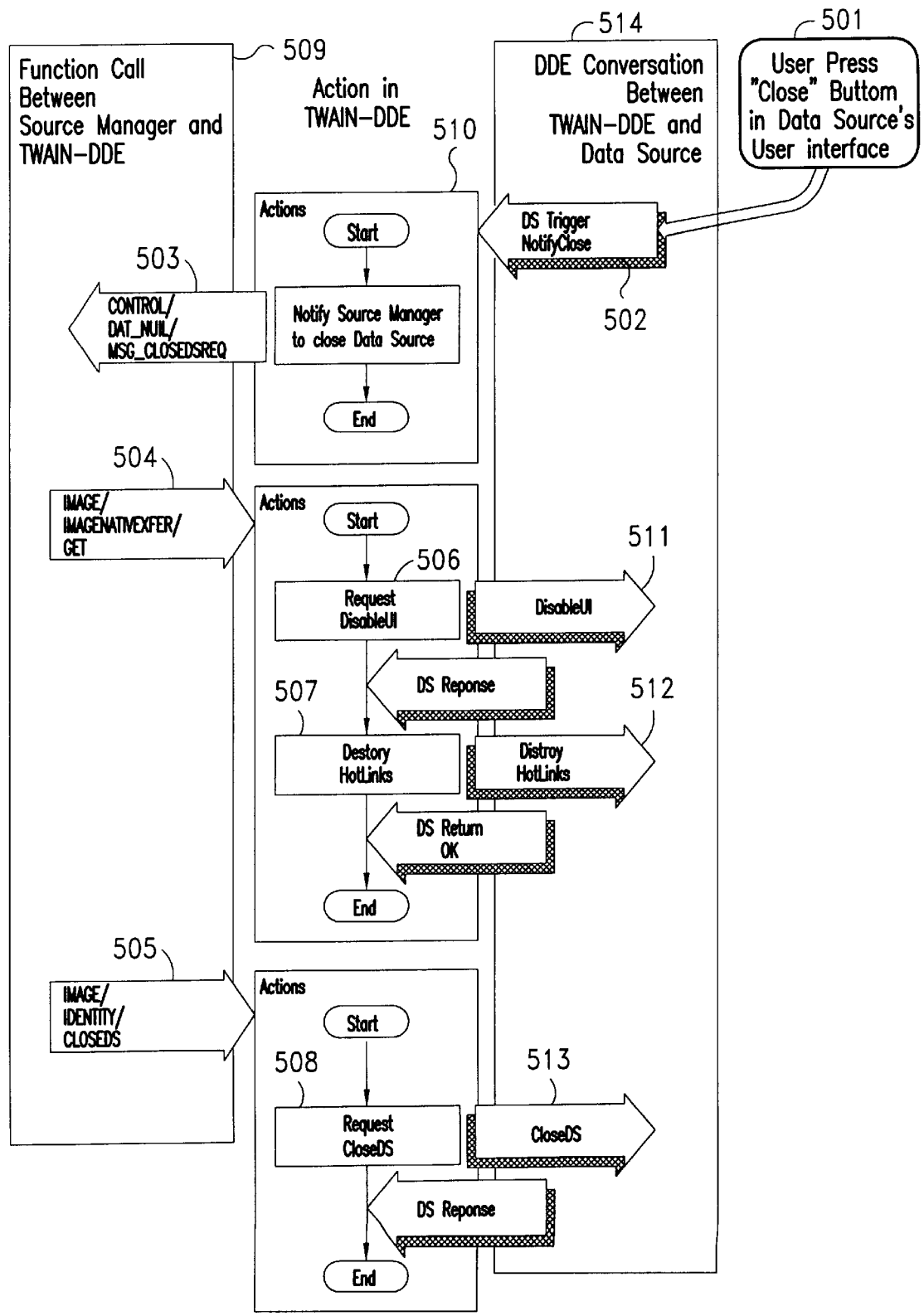
FIG. 5 is a schematic diagram showing an example of communication among Source Manager, TWAIN-DDE, and Data Source when a user wants to close the connection.

FIG. 5 shows an example of interaction among Source Manager software, TWAIN-DDE action, and Data Source software when the user wants to close the connection. The user presses "Close" button at the user interface 501 of Data Source software. The DDE conversation 514 triggers NotifyClose 502 command. TWAIN-DDE action 510 converts it into TWAIN operation triplets (DG_CONTROL/DAT_NULL/MSG_CLOSEDSREQ) 503 and sent to Source Manager software 509. In response to this TWAIN operation triplets, the Source Manager software 509 returns TWAIN operation triplets (DG_CONTROL/DAT_USERINTERFACE/MSG_DISABLEDS) 504 and (DG_CONTROL/DAT_IDENTITY/MSG_CLOSEDS) 505 to TWAIN-DDE action 510 controlled by Source Manager software 509. TWAIN-DDE action 510 takes (DG_CONTROL/DAT_USERINTERFACE/MSG_DISABLEDS) 504 and converts these operations into "DisableUI" 506, and "Destroy HotLinks" 507. DDE conversation 514 then disables the user interface 511 and destroy hotlinks 512. TWAIN-DDE action 510 also takes TWAIN operation triplets (DG_CONTROL/DAT_IDENTITY/MSG_CLOSEDS) 505 and converts them into "Request CloseDS" 508. The DDE conversation 514 then close Data Source 501 by "CloseDS" 513. If the Data Source software returns OK, the user connection will be successfully closed.

Figure 6:
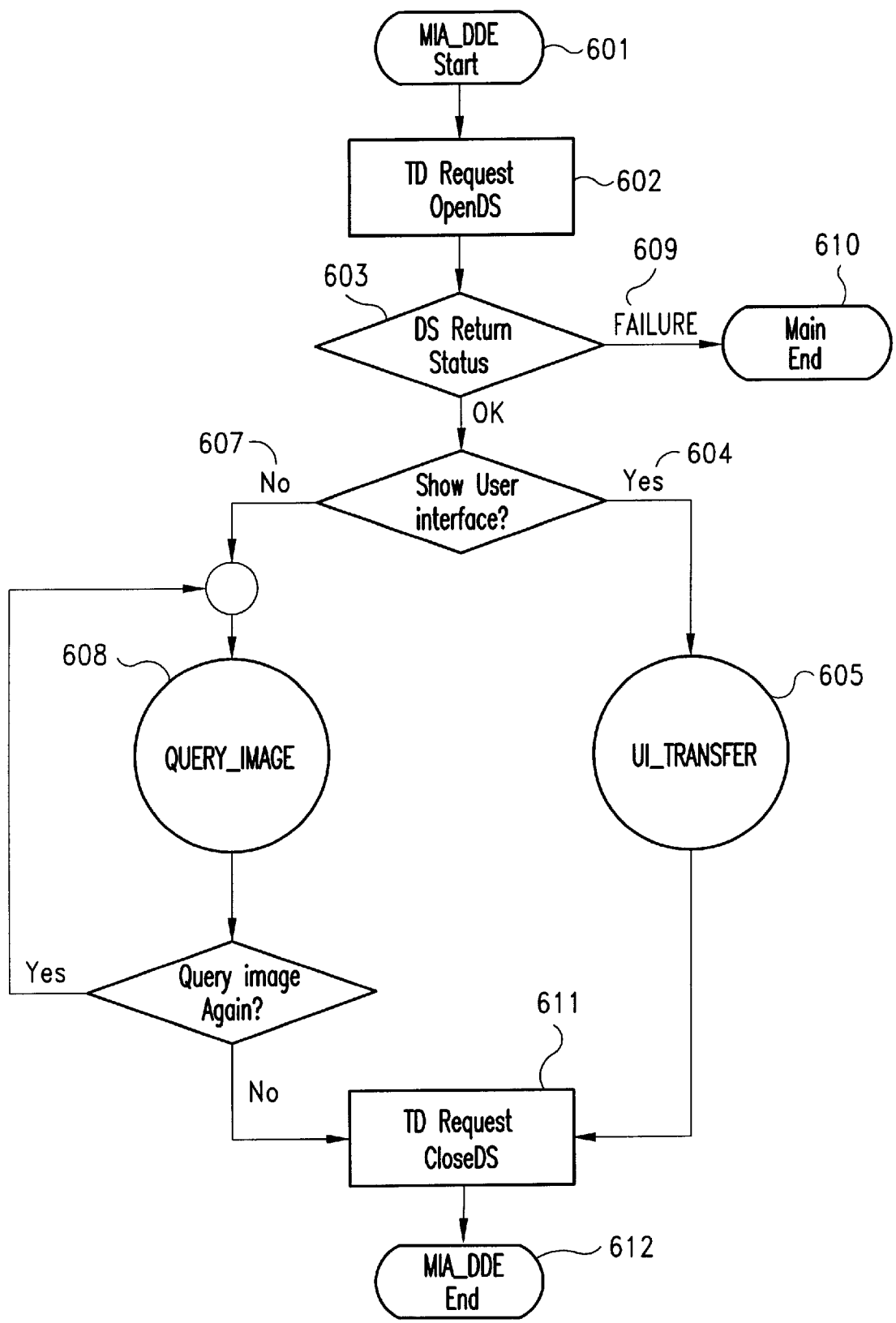
FIG. 6 is a flow chart showing the steps for the MIA-DDE executions.

The general actions of MIA-DDE can be represented in FIG. 6. When MIA_DDE is initialized 601, TWAIN-DDE requests Open Data Source (OpenDS) 602. If the Data Source returns OK 603 and shows User Interface 604, it goes to User Interface Transfer state (UI_TRASNFER) 605. If the Data Source returns OK 603 but does not show User Interface 607, it goes to image request state (QUERY_IMAGE) 608. If the Data Source returns failure 609, the communication stops 610. If User Interface Transfer state 605 or image request state 608 is finished, TWAIN-DDE requests Close Data Source (CloseDS) 611 and then MIA-DDE ends 612.

Figure 7:
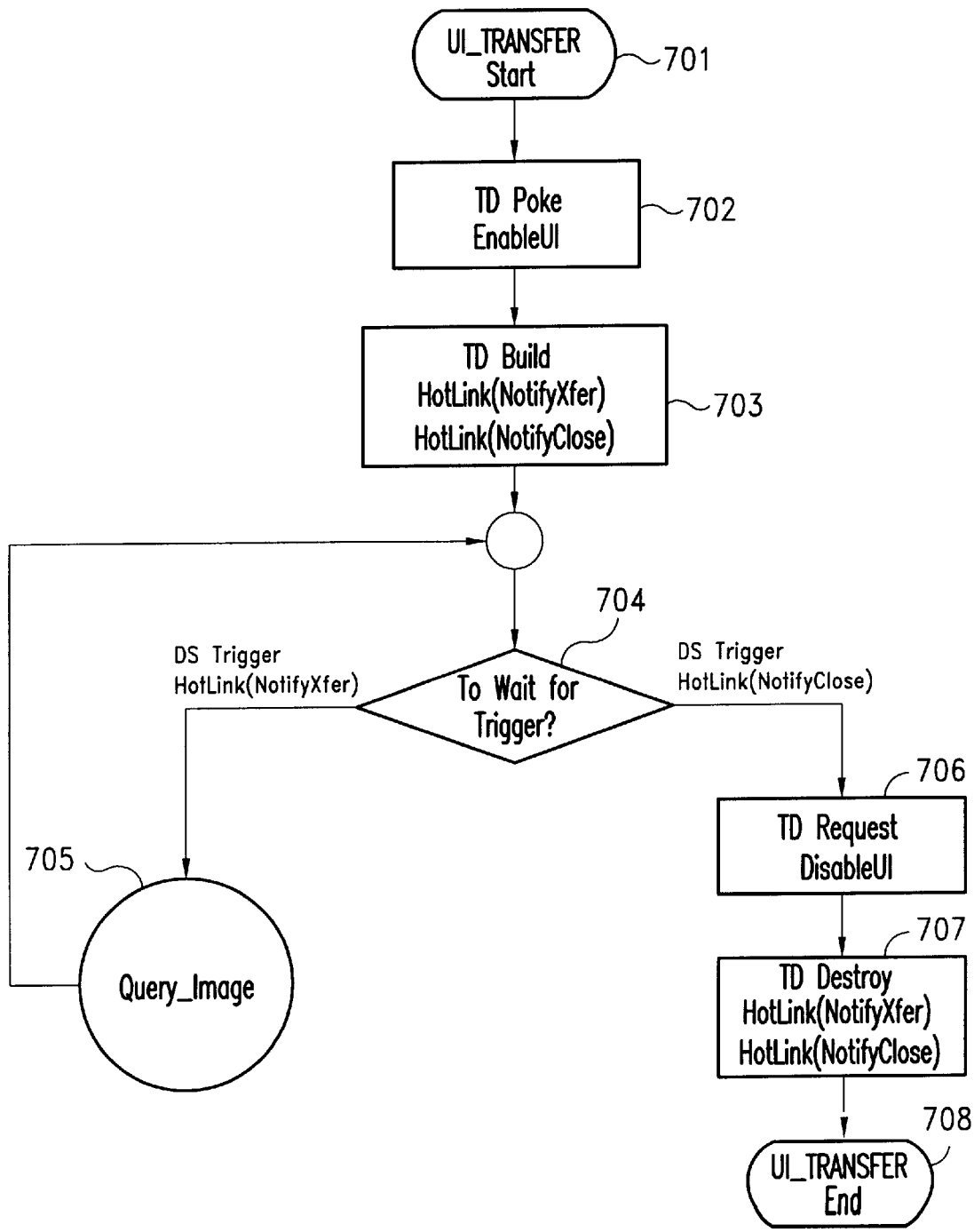
FIG. 7 is a flow chart showing the steps for the User Interface Transfer in the MIA-DDE executions.
Figure 8:
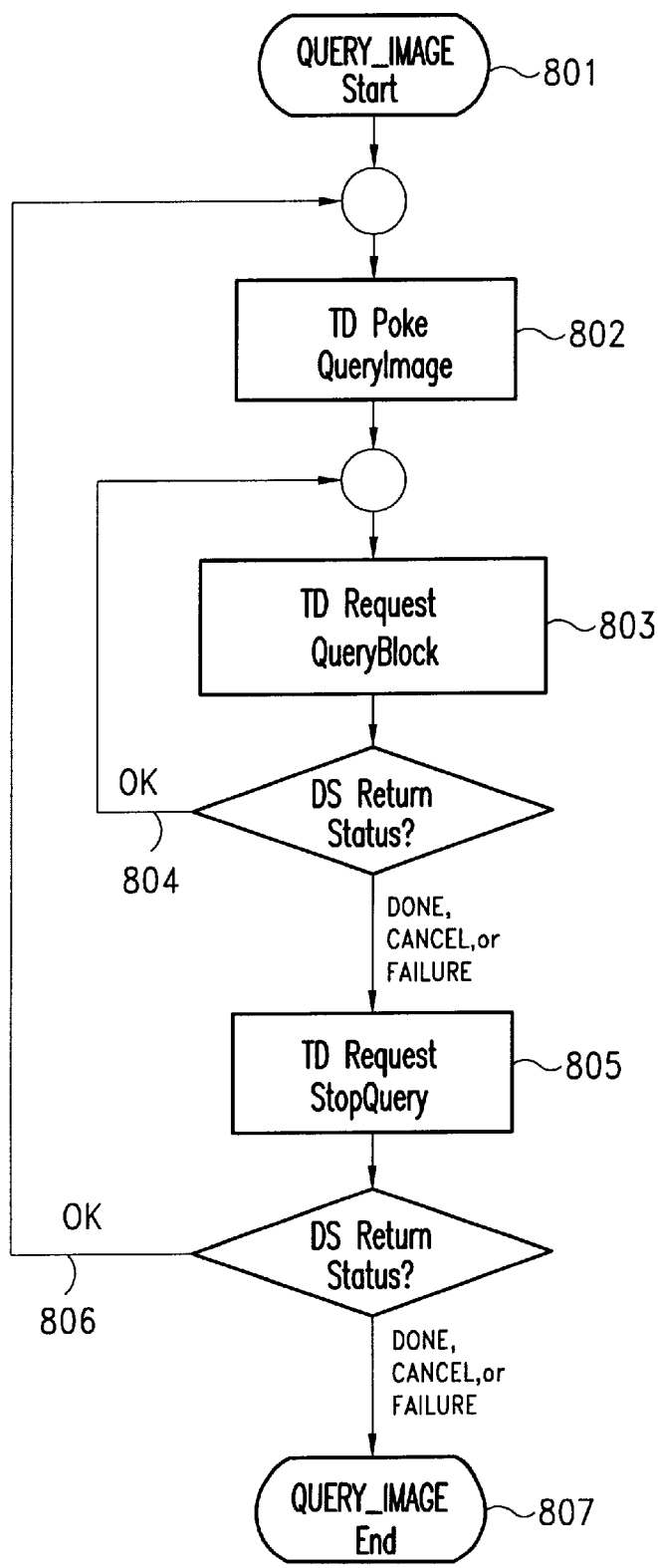
FIG. 8 is a flow chart showing the steps for the Query Image executions in the MIA-DDE executions.

The actions of User Interface Transfer (UI_TRANSFER) is illustrated in FIG. 7. When User Interface Transfer 701 is initiated, TWAIN-DDE enables User Interface (EnableUI) 702, and then builds hot links (Build HotLink(NotifyXfer), HotLink(NotifyClose)) 703. TWAIN-DDE will wait for trigger 704. If Data Source triggers HotLink(notifyXfer), then it goes to QUERY_IMAGE state 705. If Data Source triggers HotLink(NotifyClose) 706, TWAIN-DDE disables User Interface (DisableUI 706) and destroys hot links (HotLink(NotifyXfer), HotLink(NotifyClose)) 707. Consequently, the User Interface Transfer state (UI_TRANSFER state) 708 stops.

If QUERY_IMAGE state 801 is initialized, TWAIN-DDE request image data from Data Source software (poke QueryImage) 802. If Data Source software returns OK 804, then TWAIN-DDE requests image data to be transferred block by block (QueryBlock) 803. If the image data transmission is finished, canceled or failed, then TWAIN-DDE stops (StopQuery) 805. If Data Source returns OK 806, the image query process starts again. If not, the image query stops 807.

To sum up, The MIA-DDE conversation is a conversation based on Microsoft Windows Dynamic Data Exchange Conversation. It can make Data Source software as an image Server and TWAIN-DDE as a client that queries image through MIA-DDE conversation. Data Source software is not acting as a .ds model but an independent application under Windows system. It can work independently without image application software. It can stand alone for other image application software to request image from it through TWAIN and TWAIN-DDE conversion. Moreover, the invention can adapt to Windows 95/Windows NT operation systems and allow TWAIN to exist in a computer network. It should be understood that various alternatives to the structures described herein may be employed in practicing the present invention. It is intended that the following claims define the invention and that the structure within the scope of these claims and their equivalents be covered thereby.

What is claimed is:

1. A method for establishing MIA-DDE conversation between a host computer having Source Manager software and an image acquisition device having Data Source software comprising the steps of:

receiving TWAIN operation triplets in said Source Manager software, said operation triplets comprising Data Group (DG), Data Argument Type (DAT), and Message ID (MSG);

converting said TWAIN operation triplets into a plurality of TWAIN-DDE actions, said TWAIN-DDE actions comprising:
    opening said Data Source software;
    querying images from said Data Source software;
    transferring the user interface of said Data Source software; and
    closing said Data Source software;

initiating MIA-DDE conversation between said Source Manager software and said Data Source software in response to each of said TWAIN-DDE actions; and operating the image data of said image data acquisition device in response to each of said TWAIN-DDE actions.

2. The method as claimed in claim 1, wherein said MIA-DDE conversation follows the DDE definition of Microsoft Windows 95 and Windows NT.

3. The method as claimed in claim 1, wherein said host computer and said image data acquisition device exist in a computer network.

4. The method as claimed in claim 1, wherein said MIA-DDE conversation adapts to TWAIN protocol.

5. A method for requesting image data at a local computer from a remote image acquisition device, wherein said local computer and said remote image acquisition device are using TWAIN interface for data communication, comprising the steps of:

converting user instructions into TWAIN operation triplets;

forwarding said TWAIN operation triplets to a Source Manager software at said local computer for converting into TWAIN-DDE actions, said TWAIN-DDE actions comprising operations of establishing connections, enabling a user interface, and building hot links;

requesting to open a Data Source software at said remote image acquisition device;

initiating MIA-DDE conversation between said Source Manager software and said Data Source software in response to each of said TWAIN-DDE actions; and operating image data of said image acquisition device in response to said MIA-DDE actions.

6. The method as claimed in claim 5, wherein said MIA-DDE conversation converts TWAIN codes into DDE codes.

7. The method as claimed in claim 5, wherein said MIA-DDE conversation communicates said Data Source software and said Source Manager software in a computer network.

8. The method as claimed in claim 5, wherein said MIA-DDE conversation follows the DDE definition of Microsoft Windows 95 and Windows NT.

9. A method for converting TWAIN (Tool Kits Without An Interesting Name) operations into DDE (Dynamic Data Exchange) operations between Source Manager software and Data Source software, comprising the steps of:

when MIA_DDE communications is initialized, providing a TWAIN-DDE action to request to Open Data Source;

when said Data Source returns OK and shows a User Interface, providing a TWAIN-DDE action for transferring User Interface;

when said Data Source returns OK and does not show a User Interface, providing a TWAIN-DDE action for requesting an image;

when said Data Source returns failure, providing a TWAIN-DDE action to terminate said MIA_DDE communication; and when said TWAIN-DDE actions for User Interface transfer or image request has been finished, providing a TWAIN-DDE action to close said Data Source and then terminating said MIA-DDE communication.

10. The method as claimed in claim 9, wherein said TWAIN-DDE action of User Interface Transfer comprises the steps of:

when initiated, providing TWAIN-DDE actions for enabling User Interface, and then building hot links and waiting for trigger;

when said Data Source triggers said hot links, providing said Data Source to request an image; and when said Data Source triggers said hot links, providing TWAIN-DDE actions for disabling said User Interface and destroying said hot links, and terminating said User Interface Transfer.

11. The method as claimed in claim 9, wherein said TWAIN-DDE action for requesting an image comprises the steps of:

when initialized, providing a TWAIN-DDE action for requesting image data from said Data Source software;

when said Data Source software returns OK, providing a TWAIN-DDE action for requesting image data to be transferred block by block;

when said image data transmission is finished, providing a TWAIN-DDE action for terminating said TWAIN-DDE action;

when said Data Source returns OK, providing a TWAIN-DDE action for requesting an image again; and when said Data Source does not return OK, providing a TWAIN-DDE action for stop requesting an image.

* * * * *